(12) United States Patent
Li et al.

(10) Patent No.: US 12,222,286 B2
(45) Date of Patent: Feb. 11, 2025

(54) OPTICAL FIBER MULTI-PARAMETER SENSING SYSTEM AND METHOD

(71) Applicant: WENZHOU UNIVERSITY, Wenzhou (CN)

(72) Inventors: Zhihong Li, Wenzhou (CN); Xianxin Yang, Wenzhou (CN); Fei Wang, Wenzhou (CN); Haiyong Zhu, Wenzhou (CN); Xinxin Jin, Wenzhou (CN); Yanmin Duan, Wenzhou (CN)

(73) Assignee: WENZHOU UNIVERSITY, Wenzhou (CN)

( * ) Notice: Subject to any disclaimer, the term of this patent is extended or adjusted under 35 U.S.C. 154(b) by 311 days.

(21) Appl. No.: 17/929,706

(22) Filed: Sep. 4, 2022

(65) Prior Publication Data
US 2023/0408407 A1 Dec. 21, 2023

(30) Foreign Application Priority Data
Jun. 16, 2022 (CN) .......................... 202210682777.5

(51) Int. Cl.
*G01N 21/41* (2006.01)
*G01B 11/06* (2006.01)
(Continued)

(52) U.S. Cl.
CPC .............. *G01N 21/41* (2013.01); *G01B 11/06* (2013.01); *G01N 21/21* (2013.01);
(Continued)

(58) Field of Classification Search
CPC .... G01N 21/41; G01N 21/21; G01N 21/7703; G01N 2021/772; G01N 2021/7723;
(Continued)

(56) References Cited

U.S. PATENT DOCUMENTS

| | | | |
|---|---|---|---|
| 6,934,024 B2 * | 8/2005 | Zhan ........................ | G01J 4/00 356/369 |
| 2001/0048072 A1 * | 12/2001 | Painchaud ............. | G01B 11/06 250/227.14 |
| 2008/0060438 A1 * | 3/2008 | Shinbo ................. | G01N 21/553 73/579 |

FOREIGN PATENT DOCUMENTS

| CN | 105277513 A | * | 1/2016 | ............. G01N 21/41 |
|---|---|---|---|---|
| CN | 113029969 A | * | 6/2021 | ............. G01N 21/21 |

OTHER PUBLICATIONS

Knigge, Anja et al. "Polarization analyzer for fiber optics and free beam applications", Schäfter+Kirchhoff GmbH, May 7, 2021, pp. 1-6 (Year: 2021).*

(Continued)

*Primary Examiner* — Tarifur R Chowdhury
*Assistant Examiner* — Kaitlyn E Kidwell
(74) *Attorney, Agent, or Firm* — Chiesa Shahinian & Giantomasi PC

(57) ABSTRACT

An optical fiber multi-parameter sensing system and method are provided. The optical fiber multi-parameter sensing system comprises a light source, an optical circulator, a fiber-tip probe sensor and an optical spectrum analyzer, wherein the fiber-tip probe sensor can be placed into an analyte without changing the characteristics of the analyte. The variation of a bulk parameter that is a bulk refractive index of bulk environment around the fiber-tip probe sensor and a surface parameter which is a thickness of surface dielectric layer of the fiber-tip probe sensor can be determined simultaneously by monitoring the changing of resonance intensity and resonance wavelength of a single fiber-tip leaky mode resonance. The sensing system optionally configured such that multiple parameters in the analyte around the fiber-tip probe sensor can be obtained by detecting a single resonance peak.

8 Claims, 14 Drawing Sheets

(51) Int. Cl.
 *G01N 21/21* (2006.01)
 *G01N 21/77* (2006.01)
(52) U.S. Cl.
 CPC ... *G01N 21/7703* (2013.01); *G01N 2021/772* (2013.01); *G01N 2021/7723* (2013.01); *G01N 2021/7773* (2013.01)
(58) Field of Classification Search
 CPC . G01N 2021/7773; G01N 2291/02854; G01N 2291/01; G01B 11/06; G01D 5/35367; G01D 5/353; G02B 6/2932
 See application file for complete search history.

(56) References Cited

OTHER PUBLICATIONS

English machine translation of CN-113029969 (Year: 2021).*

* cited by examiner

OPTICAL FIBER MULTI-PARAMETER SENSING SYSTEM AND METHOD

CROSS REFERENCE TO RELATED APPLICATION

This application claims the benefit and priority of Chinese Patent Application No. 202210682777.5 filed on Jun. 16, 2022, the disclosure of which is incorporated by reference herein in its entirety as part of the present application.

TECHNICAL FIELD

The present disclosure relates to the field of optical fiber sensing technology, in particular to an optical fiber multi-parameter sensing system and method.

BACKGROUND

In recent years, skilled persons have been attempting to to reduce the size of optical fiber sensing systems, improve their portability and the sensing schemes based on optical fiber end facets and tapered optical fiber end facets. The fiber-tip sensing schemes generally include surface plasmon resonance excited by noble metal nanostructures on the fiber end facet, photonic crystal resonance generated by dielectric nanostructures on the fiber end facet, and Bloch resonance excited by dielectric structures consisting of periodic components characterized by high and low refractive indices on the fiber end facet, etc. The fiber-tip sensing schemes provide several advantages over side-sensing schemes, for instance, the miniaturization of sensing device, the reduction of resonance bandwidth, and decreased sensing resolution, etc. In addition, the interaction between analytes causes simultaneous changing of multiple parameters of the bulk and surface environment of the optical fiber sensor, which is characterized by the simultaneous variation of bulk refractive index involved in the bulk environment and the thickness of surface dielectric layer related to the surface environment of the optical fiber sensor. However, the optical fiber sensing technologies reported to date are used for measuring the bulk refractive index of the external environment. As such, it is difficult to distinguish the bulk parameter from the surface parameter, and measure both at the same time. This clearly indicates that the sensing signal obtained with conventional optical fiber sensing technologies is affected by the changing of the surface characteristics. Therefore, it is urgently desired to develop a highly sensitive miniaturized optical fiber sensor which is capable of decoupling the bulk and surface characteristics around the optical fiber sensor.

SUMMARY

The present invention provides an optical fiber multi-parameter sensing system and method for same, whereby the changing of bulk and surface parameters of the analyte around the fiber-tip probe sensor can be simultaneously measured, and detection efficiency of the changing of analyte can be improved.

In a first aspect, the present disclosure provides an optical fiber multi-parameter sensing system.

The optical fiber multi-parameter sensing system comprises a light source, an optical circulator, a fiber-tip probe sensor and an optical spectrum analyzer;

The light source is connected to a first port of the optical circulator, so that the light wave outputted from the light source is optically coupled into the optical circulator.

An input end of the fiber-tip probe sensor is connected to a second port of the optical circulator, and the terminal end is placed into the analyte to be measured; the light wave outputted from the second port of the optical circulator corresponds to incident light wave of the fiber-tip probe sensor and is guided by the core of the optical fiber; the incident light wave after propagation along a core of an optical fiber losses energy at the terminal end of the fiber-tip probe sensor; in other words, some of the energy of the incident light wave is coupled into external environment to thereby excite fiber-tip leaky modes, and the remainder is reflected light wave that is reflected back into the core of the optical fiber and is coupled into the optical circulator after the propagation along the core.

The optical spectrum analyzer is connected to a third port of the optical circulator and is configured to receive a signal of the reflected light wave for detecting a resonance wavelength and a resonance intensity of the reflected light wave; determine, based on shifting in the resonance wavelength of the reflected light wave, a surface parameter, which is a thickness of a dielectric layer formed by the analyte molecules 53 on an end facet of the fiber-tip probe sensor; determine, according to changing resonance intensity of the reflected light wave, and a bulk parameter, which is a bulk refractive index of a bulk environment around the fiber-tip probe sensor.

The sensing system may also be adapted for different measurements, for example, when the analysis of polarization-dependent characteristics is needed, the optical fiber multi-parameter sensing system may further comprises a polarization control apparatus.

The polarization control apparatus is arranged between the light source and the first port of the optical circulator, the light source is connected to an input port of the polarization control apparatus, and an output port of the polarization control apparatus is connected to the first port of the optical circulator; the polarization control apparatus is configured to convert the output light wave of the light source into linearly polarized light that is coupled into the optical circulator.

Optionally, the polarization control apparatus comprises a polarizer and a polarization analyzer, which are operably connected in a sequential manner.

The polarizer is configured to convert the output light wave of the light source into linearly polarized light, and the polarization analyzer is configured to adjust a polarization direction of the linearly polarized light.

Optionally, the fiber-tip probe sensor comprises an optical fiber and a micro-nano thin film coated on the end facet of the optical fiber.

The optical fiber comprises a core and a cladding layer surrounding the core.

The micro-nano thin film is configured to interact with the dynamically changing analyte, and a portion of the analyte molecules are absorbed on the end facet of the fiber-tip probe sensor to generate a dielectric layer; the interaction results in the variation of the thickness of the dielectric layer of the fiber-tip probe sensor.

Optionally, the micro-nano thin film composition is selected from a group consisting of dielectric material, metal material, metal oxide material, semiconductor material, two-dimensional material, polymer material, and combinations thereof.

Optionally, the optical fiber is a single-mode optical fiber, a few-mode optical fiber, a multi-mode optical fiber, a micro-nano optical fiber or a coreless optical fiber.

Optionally, the fiber-tip probe sensor further comprises one or more protective layers coated on an outer surface of the cladding of the optical fiber.

In a second aspect, the present invention further provides an optical fiber multi-parameter sensing method that is capable of discriminating between the surface and bulk characteristics of analyte around the fiber-tip probe sensor by utilizing the optical fiber multi-parameter sensing system as described above. The method comprises the following steps:

obtaining the resonance wavelength and the resonance intensity of the reflected light wave that is detected with the optical spectrum analyzer;

determining a surface parameter that is a thickness of a dielectric layer formed from the analyte molecules on an end facet of the fiber-tip probe sensor according to a shifting in the resonance wavelength of the reflected light wave; and determining a bulk parameter that is a bulk refractive index of a bulk environment around the fiber-tip probe sensor according to changes of the resonance intensity of the reflected light wave.

Compared with existing technologies and according to the embodiments provided by the present disclosure, the inventions disclosed herein have the following beneficial technical effects:

(1) According to the optical fiber multi-parameter sensing system and method provided by the present invention, the optical fiber multi-parameter sensing system comprises a light source, an optical circulator, a fiber-tip probe sensor and an optical spectrum analyzer. The light source is connected to a first port of the optical circulator, so that the light wave from the light source is optically coupled into the optical circulator. The input end of the fiber-tip probe sensor is connected to a second port of the optical circulator, and the terminal end is placed into the analyte to be measured. The light wave outputted from the second port of the optical circulator corresponds to incident light wave of the fiber-tip probe sensor and is guided by the core of the optical fiber. The incident light wave after the propagation along the core of the optical fiber losses energy at the terminal end of the fiber-tip probe sensor; in other words, a portion of the energy of the incident light wave is coupled into external environment to thereby excite fiber-tip leaky modes, and the remainder is reflected light wave that is reflected back into the core of the optical fiber and is coupled into the optical circulator after the propagation along the core. The optical spectrum analyzer is connected to a third port of the optical circulator and is configured to receive a signal of the reflected light wave for detecting a resonance wavelength and a resonance intensity of the reflected light wave; determine, based on a shifting in the resonance wavelength of the reflected light wave, a surface parameter of the analyte, which is the thickness of a dielectric layer formed from the analyte molecules on an end facet of the fiber-tip probe sensor; determine, according to changing resonance intensity of the reflected light wave, a bulk parameter, which is a bulk refractive index of a bulk environment around the fiber-tip probe sensor. According to the optical fiber multi-parameter sensing system and method provided by the present invention, the fiber-tip probe sensor can be placed into the analyte, and the surface and bulk parameters characterized by the bulk refractive index and the thickness of the dielectric layer of the dynamically changing analyte around the fiber-tip probe sensor can be simultaneously determined with a single detection by the optical spectrum analyzer of the changes of resonance wavelength and resonance intensity of the fiber-tip leaky modes, without changing the characteristics of the analyte. Thus, multiple parameters of the analyte around the fiber-tip probe sensor can be obtained through a single detection. Compared with existing multi-channel, multi-measurement and other sensing technologies, the sensing system provided by the present disclosure can realize simultaneous measurement of both the bulk and surface parameters, and thereby the detection efficiency of the dynamically changing analyte is improved.

(2) In the present invention, the fiber-tip probe sensor adopted in the sensing system provided by the present disclosure includes an optical fiber and a micro-nano thin film coated on the end facet of the optical fiber. Compared with conventional sensing schemes, the fiber-tip probe sensor offers the advantages of maintenance of structural integrity of the optical fiber, good mechanical strength and stability, miniaturization, and mass produced. Meanwhile, sensitive region of the fiber-tip probe sensor is only on the micro-nano scale. Said probe can be implemented in the microenvironment at the scale of micro-nano meter and realize the accurate single point measurement and reduce the usage of samples to be measured.

(3) In the present invention, a wide range of micro-nano thin film materials are available for the generation of fiber-optic leaky mode resonance. According to the requirements of applications, one or more of a dielectric material, a metal material, a metal oxide material, a semiconductor material, a two-dimensional material and a polymer material can be applied to generate the fiber-tip leaky mode resonance and to expand the application fields of the sensing system. Also, the optical setup of the sensing system is very simple, as both input signals and sensing signals are transmitted in a lossless all-fiber channel. Thus, the sensing system is suitable for remote online in-situ detection. Furthermore, in combination with the wavelength division multiplexing technology, time division multiplexing technology and other information processing technologies as well as specific response characteristics of thin film materials, the sensing system can be applied to readily realize a multi-point distributed sensor network.

BRIEF DESCRIPTION OF THE DRAWINGS

To more clearly illustrate the embodiment of the present invention or the technical scheme in the prior art, the following briefly introduces the attached figures to be used in the embodiment. The referenced figures merely show specific embodiments of the present invention, and those skilled in the art may derive other drawings from these attached figures without creative efforts.

REFERENCE SIGNS 1, light source; 2, polarization control apparatus; 21, polarizer; 22, polarization analyzer; 3, optical circulator; 4, fiber-tip probe sensor; 41, core; 42, cladding; 43, micro-nano thin film; 44, fiber core mode; 45, fiber-tip leaky mode; 5, analyte; 51, bulk environment; 52, surface environment; 53, analyte molecule; and 6, optical spectrum analyzer.

DETAILED DESCRIPTION

The following describes the technical scheme in the embodiments of the present invention with reference to the attached figures in the embodiments of the present disclosure. The described specific embodiments are an illustration of the embodiments of the present invention. All other embodiments obtained by the ordinary technical staff in the art without creative input are within the scope of the present disclosure.

The present invention provides an optical fiber multi-parameter sensing system and method of same, by which the changing of bulk and surface parameters can be simultaneously measured, and the detection efficiency of the changing of analyte can be improved.

Specific embodiments of the present invention is further described in detail below with reference to the attached figures and specific embodiments.

Embodiment I

Figure 1:
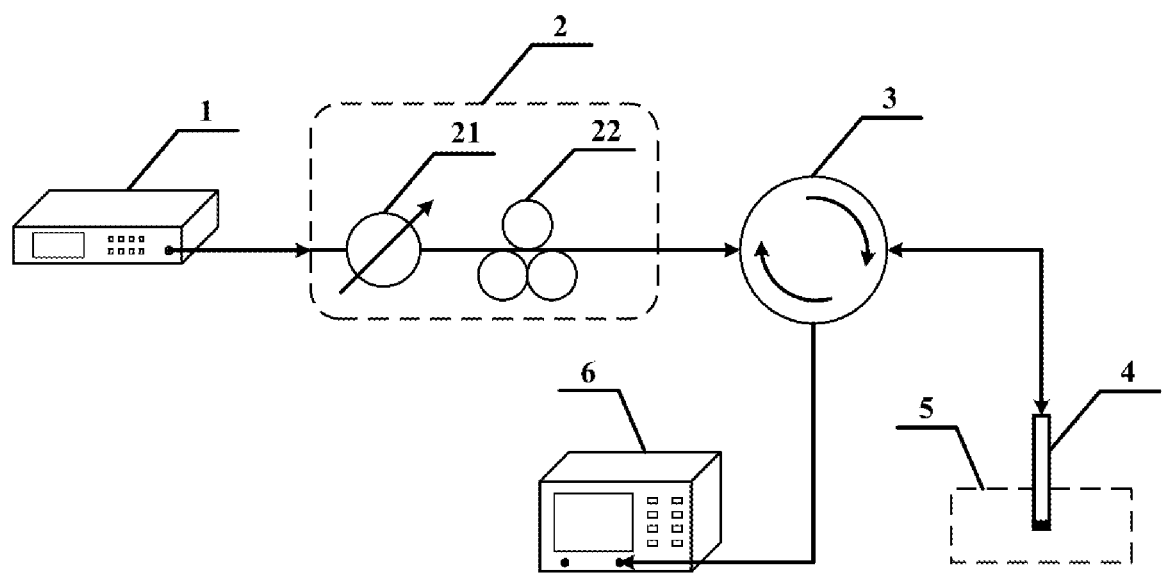
FIG. 1 is a schematic diagram of an optical fiber multi-parameter sensing system according to the first embodiment of the present invention.

The embodiment provides an optical fiber multi-parameter sensing system. As shown in FIG. 1, the optical fiber multi-parameter sensing system comprises a light source 1, an optical circulator 3, a fiber-tip probe sensor 4 and an optical spectrum analyzer 6.

The light source 1 is connected to a first port of the optical circulator 3, so that the light wave outputted from the light source is optically coupled to the optical circulator 3.

An input end of the fiber-tip probe sensor 4 is connected to a second port of the optical circulator 3, and its terminal end is placed into an analyte 5. The light wave outputted from the second port of the optical circulator 3 corresponds to incident light wave of the fiber-tip probe sensor 4. The incident light wave travels along the core 41 of the optical fiber and losses energy at the terminal end of the fiber-tip probe sensor 4. In other words, some of the energy of the incident light wave is coupled into external environment to excite fiber-tip leaky modes 45; and the remainder is reflected light wave that is reflected back into the core 41 of the optical fiber and is coupled into the optical circulator 3 after the propagation along the core 41 of the optical fiber. The analyte 5 has a plurality of analyte molecules 53 dispersed therein, some of which are absorbed or deposited on the surface of the fiber-tip probe sensor 4 through the interaction with the macro-nano thin film 43 to generate a dielectric layer 52.

The optical spectrum analyzer 6 is connected to a third port of the optical circulator 3 and is configured to receive a signal of reflected light wave for detecting a resonance wavelength and a resonance intensity of the reflected light wave; determine, based on the shifting in the resonance wavelength of the reflected light wave, a surface parameter of the analyte, which is the thickness of a dielectric layer 52 formed from the analyte molecules 53 on an end facet of the fiber-tip probe sensor 4; and determine, according to the change of the resonance intensity of the reflected light wave, a bulk parameter, which is the bulk refractive index of the analyte 5 around the fiber-tip probe sensor 4.

If analysis of polarization characteristics is necessary, the optical fiber multi-parameter sensing system further comprises a polarization control apparatus 2.

The polarization control apparatus 2 is arranged between the light source 1 and the first port of the optical circulator 3, the light source 1 is connected to an input port of the polarization control apparatus 2, and an output port of the polarization control apparatus 2 is connected to the first port of the optical circulator 3. The polarization control apparatus 2 is configured to convert the light wave outputted from the light source into linearly polarized light that is coupled to the optical circulator 3.

The polarization control apparatus 2 in the embodiment comprises a polarizer 21 and a polarization analyzer 22, which are operably connected in a sequential manner.

The polarizer 21 is configured to convert the output light waves of the light source 1 into linearly polarized light, and the polarization analyzer 22 is configured to control a polarization direction of the linearly polarized light.

In the embodiment, the fiber-tip probe sensor 4 comprises an optical fiber and a micro-nano thin film 43 coated on the end facet of the optical fiber.

The optical fiber comprises a core 41 and a cladding 42 surrounding the surface of the core 41.

The micro-nano thin film 43 is configured to interact with the dynamically changing analyte 5, so that some of the analyte molecules 53 are absorbed on the surface of the fiber-tip probe sensor 4 to generate a dielectric layer 52, and the thickness of the dielectric layer 52 varies with the interaction.

The micro-nano thin film composition in the fiber-tip probe sensor 4 is selected from a group consisting of dielectric material, metal material, metal oxide material, semiconductor material, two-dimensional material, polymer material, and combinations thereof.

The optical fiber in the fiber-tip probe sensor 4 can be one of a single-mode optical fiber, a few-mode optical fiber, a multi-mode optical fiber, a micro-nano optical fiber or a coreless optical fiber.

The fiber-tip probe sensor 4 may further comprise one or more protective layers coated on the outer surface of the cladding 42 of the optical fiber to reduce corrosion or damage caused by the analyte 5.

Figure 2:
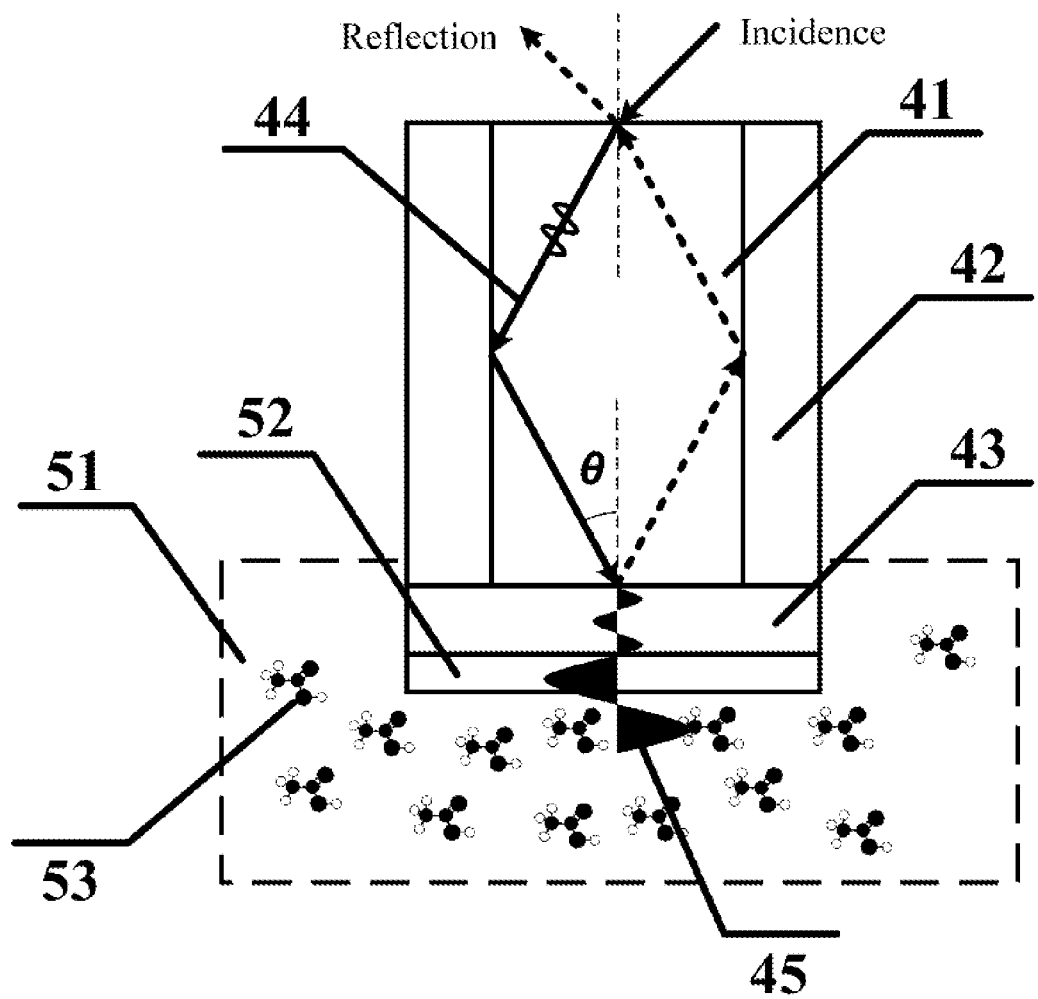
FIG. 2 is a structural schematic diagram of a fiber-tip probe sensor according to the first embodiment of the present invention.

As shown in FIG. 2, the operating principle of the fiber-tip probe sensor 4 to perform multi-parameter sensing is described as follows.

The light wave outputted from the light source 1 sequentially passes through the polarization control apparatus 2 (which is an optional element) and the optical circulator 3, and then enters the core 41 of the optical fiber of the fiber-tip probe sensor 4, to thereby excite a number of fiber core modes 44. The fiber core modes 44 undergo multiple total internal reflection at the interface between the core 41 and the cladding 42, and then impinge upon the interface between the core 41 and the micro-nano thin film 43 with an incident angle θ. Due to the limitation of total internal reflection at the interface between the core 41 and the cladding 42, the incident angle θ is small, so that each fiber core mode 44 at a specific wavelength, namely the resonance wavelength, can tunnel through the micro-nano thin film 43 and is coupled into the analyte 5, to excite the fiber-tip leaky mode 45. The mode field of the fiber-tip leaky mode 45 is mainly distributed in the analyte 5. The energy loss of the fiber core mode 44 at the resonance wavelength results in the generation of fiber-tip leaky mode resonance corresponding to resonance dips at the resonance wavelengths in the reflection spectrum of the fiber-tip probe sensor 4.

The fiber-tip probe sensor 4 is placed into the analyte 5. The dynamical changing of the analyte 5 in a microenvironment around the fiber-tip probe sensor 4 results in the variation of the bulk environment 51 that is characterized by a bulk characteristic, namely the bulk refractive index around the fiber-tip probe sensor 4. Meanwhile, the interaction between the analyte molecules 53 and the surface of the fiber-tip probe sensor 4, such as absorption or deposition, molecular bonding or dissolution, causes changes to the surface environment 52 that is characterized by a surface parameter, namely the thickness of dielectric layer. The combined effects of changing of bulk and surface parameters causes variation of characteristic parameters including the resonance wavelength and resonance intensity of the fiber-tip leaky mode resonance that is detected by the optical spectrum analyzer 6. Thus, the real-time measurement of both bulk and surface parameter is possible by monitoring the changing of the characteristic parameters of the fiber-tip leaky mode resonance.

Embodiment II

Figure 3:
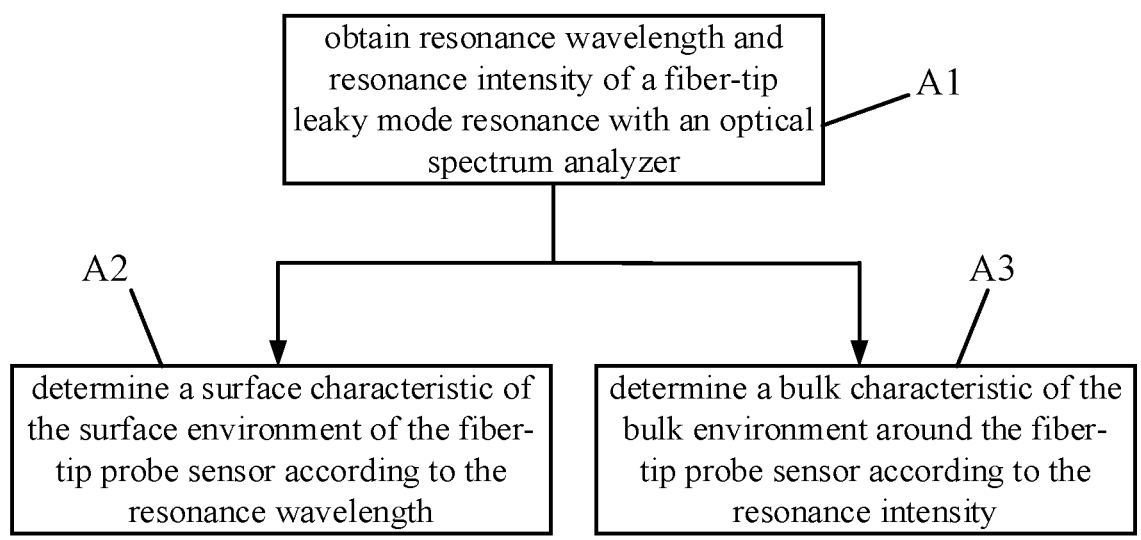
FIG. 3 is a flow diagram of an optical fiber multi-parameter sensing method according to the first embodiment of the present invention.

As shown in FIG. 3, based on an optical fiber multi-parameter sensing system provided by the first embodiment, the embodiment II provides an optical fiber multi-parameter sensing method that includes the following steps A1 to A3.

In step A1, the resonance wavelength and the resonance intensity of the fiber-tip leaky mode resonance are obtained through the optical spectrum analyzer.

In step A2, according to the shifting in resonance wavelength, the surface parameter, that is the thickness of the dielectric layer corresponding to the analyte molecules absorbed on end facet of the fiber-tip probe sensor, is determined. In step A3, according to the changing of resonance intensity, the bulk parameter that is the bulk refractive index of the surrounding environment around the fiber-tip probe sensor is determined.

The sensing system may be adapted for different analyses for example, when analysis of polarization-dependent characteristics is required, a polarization control apparatus is arranged between the light source and the first port of the circulator. In this regard, the optical fiber multi-parameter sensing method comprises the following steps B1 to B3.

In step B1, a linearly polarized light in either transverse-electric (TE) polarization or transverse-magnetic (TM) polarization generated by the polarization control apparatus is incident to the first port of the optical circulator, and the TE-/TM-polarized resonance wavelength and resonance intensity are obtained with the optical spectrum analyzer.

In step B2, according to the shifting in TE-/TM-polarized resonance wavelength, the surface parameter, the thickness of the dielectric layer corresponding to the analyte molecules absorbed on the end facet of the fiber-tip probe sensor, is determined.

In step B3, according to the changing of TE-/TM-polarized resonance intensity, the bulk parameter that is the bulk refractive index of the surrounding environment around the fiber-tip probe sensor is determined.

The real-time measurement of both bulk and surface parameters can be realized by monitoring the change of the characteristic parameters of the fiber-tip leaky mode resonance. Specifically, the changing of bulk environment causes the variation of the resonance intensity of the fiber-tip leaky mode resonance while the resonance wavelength remains constant. By monitoring the changing of resonance intensity of the fiber-tip leaky mode resonance obtained with the optical spectrum analyzer, the dynamic change information of the characteristic parameter of the bulk environment, the bulk refractive index, is determined. Meanwhile, the changing of the surface environment causes the shifting in resonance wavelength of the fiber-tip leaky mode resonance, while the resonance intensity keeps stable. By monitoring the shifting in the resonance wavelength of the fiber-tip leaky mode obtained with the optical spectrum analyzer, the dynamic change information of the characteristic parameter of the surface environment, the thickness of the dielectric layer, is obtained.

The operation principle discriminating between the bulk and surface parameter in real time is illustrated by monitoring the changing of a single fiber-tip leaky mode resonance, in conjunction with the following several specific examples.

In the first example, the optical fiber multi-parameter sensing system that includes a light source, an optical circulator, a fiber-tip probe sensor and an optical spectrum analyzer is used for the measurement, and the output spectrum of the light source ranges from 0.4 μm to 2.0 μm.

The fiber-tip probe sensor comprises a multi-mode optical fiber and a high-refractive-index titanium dioxide thin film coated on the end facet of the optical fiber. The multi-mode optical fiber is an FT200EMT multi-mode optical fiber from Thorlabs Inc., with the diameters of the core and the cladding being 200 μm and 225 μm, respectively. The thickness of the titanium dioxide film is 400 nm.

The microenvironment around the fiber-tip probe sensor includes a bulk environment and a surface environment. The bulk environment is liquid solution and is characterized by a bulk parameter being bulk refractive index. The initial bulk refractive index is 1.315 and increased up to 1.355, which corresponds to the dynamic changing of the bulk environment. The surface environment is a dielectric layer on the surface of the titanium dioxide film and is characterized by a surface parameter being the thickness of dielectric layer. The thickness of dielectric layer is increased from 0 nm to 20 nm, which corresponds to the dynamic changing of the surface parameter.

Figures 4A, 4B:
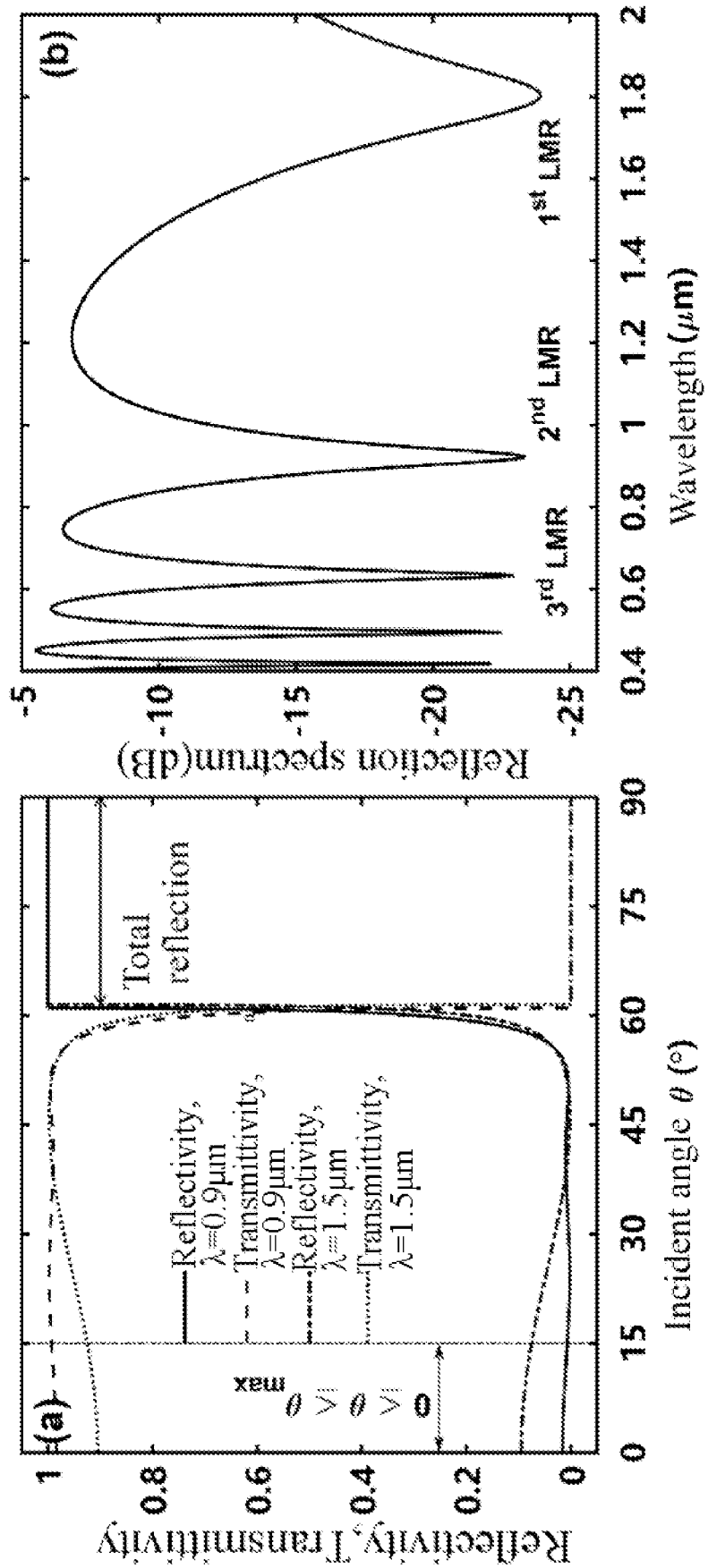
FIG. 4A is a relationship diagram of an incident angle, a reflectivity and a transmissivity in the second embodiment of the present invention.
FIG. 4B is a reflection spectrum of a fiber-tip probe sensor in the second embodiment of the present invention.
Figure 5A:
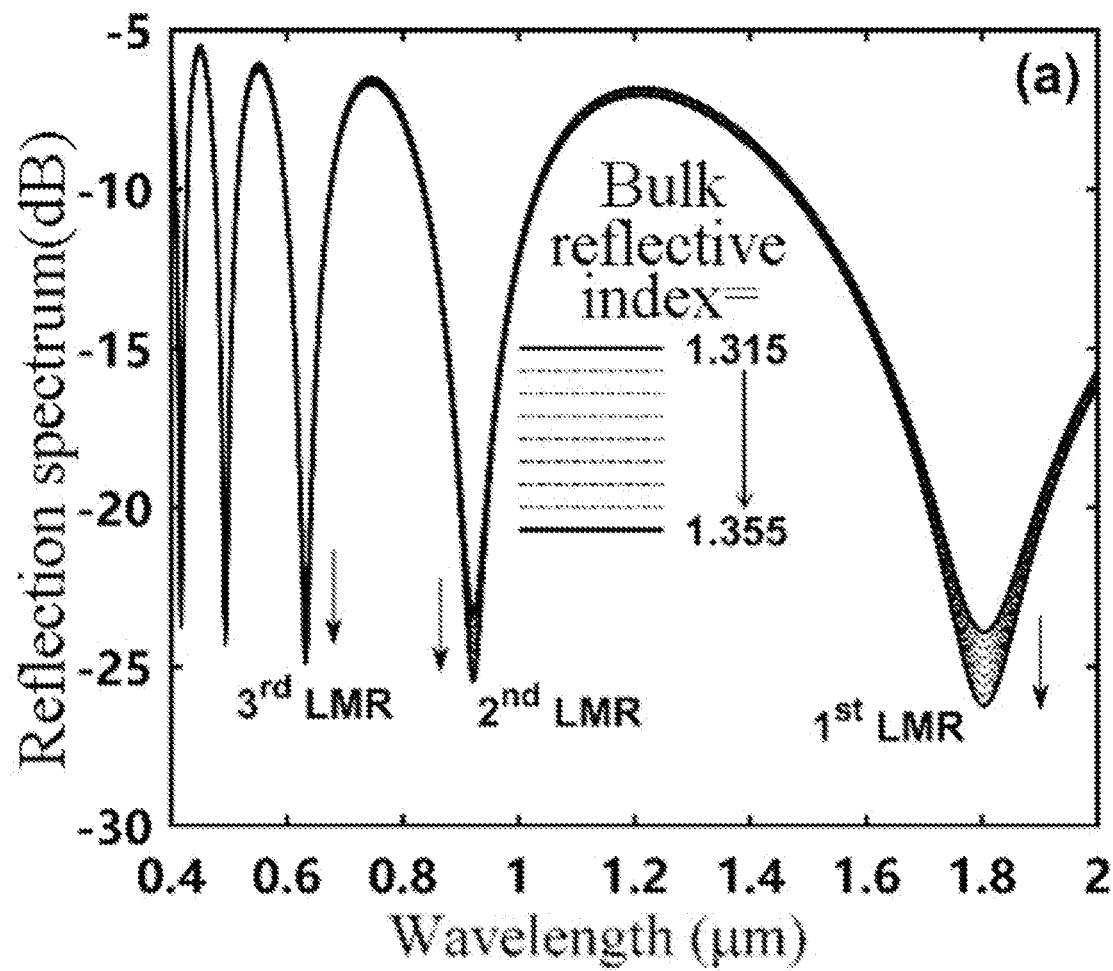
FIGS. 5A-D are diagrams showing the bulk sensing characteristic of a fiber-tip probe sensor (in the case of generating fiber-tip leaky mode resonances with a titanium dioxide thin film) in the second embodiment of the present invention.
Figure 5B:
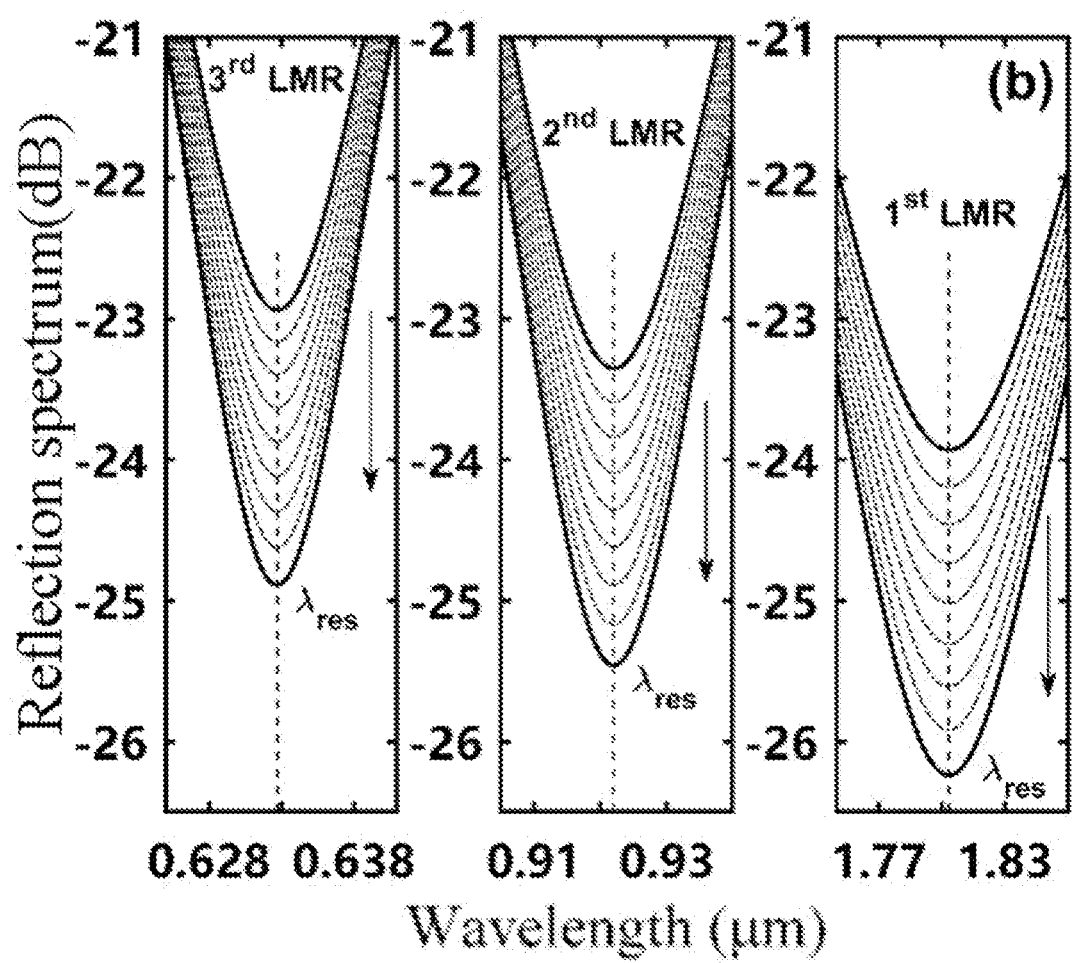
Figure 5C:
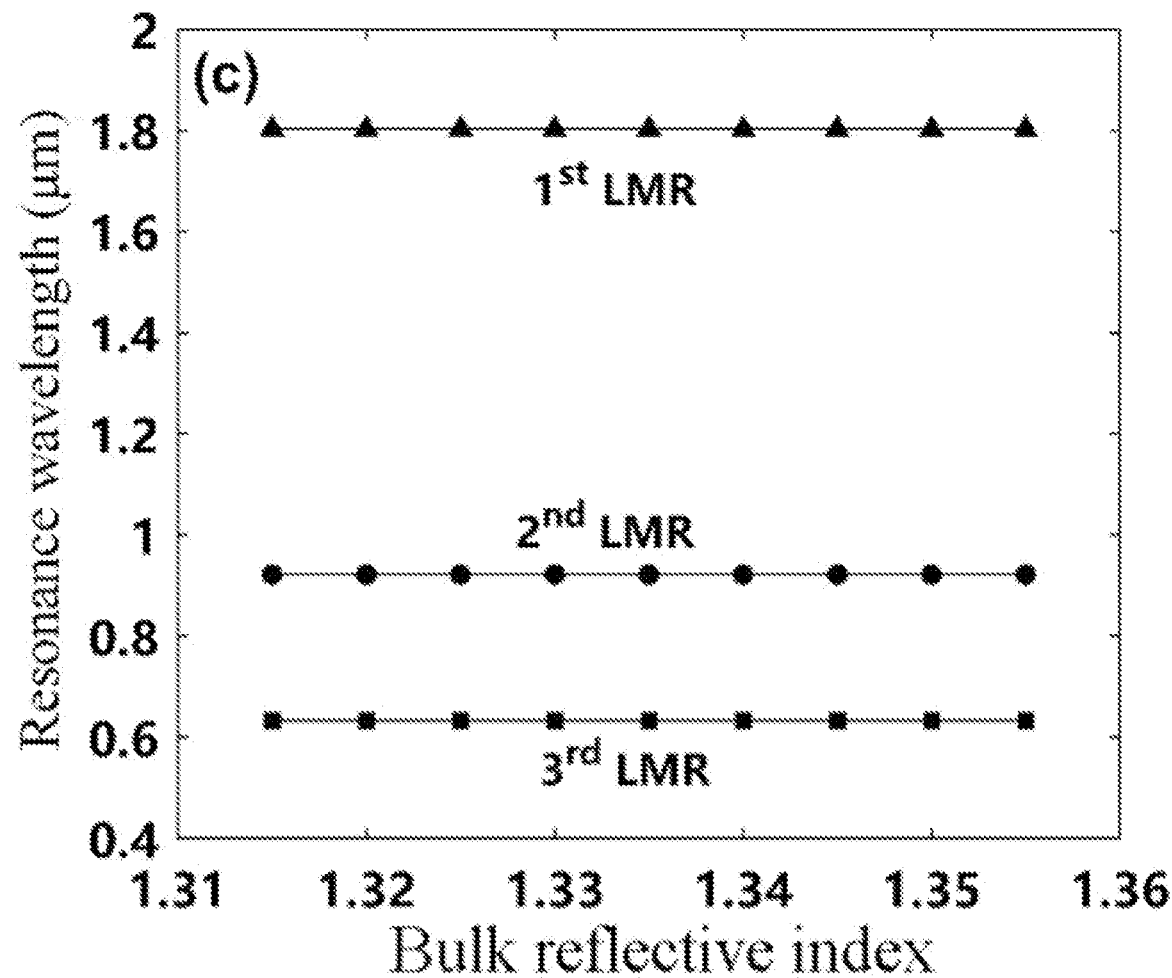
Figure 5D:
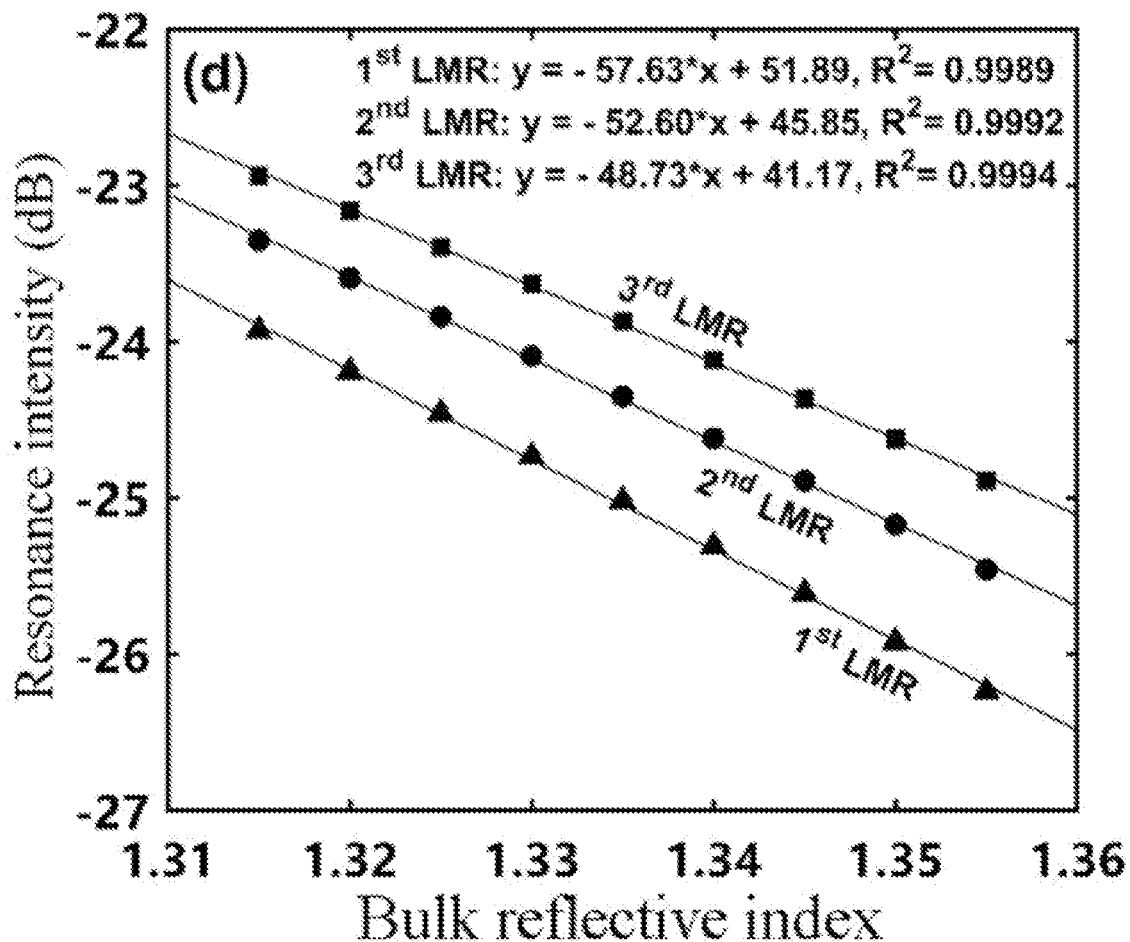
Figure 6A:
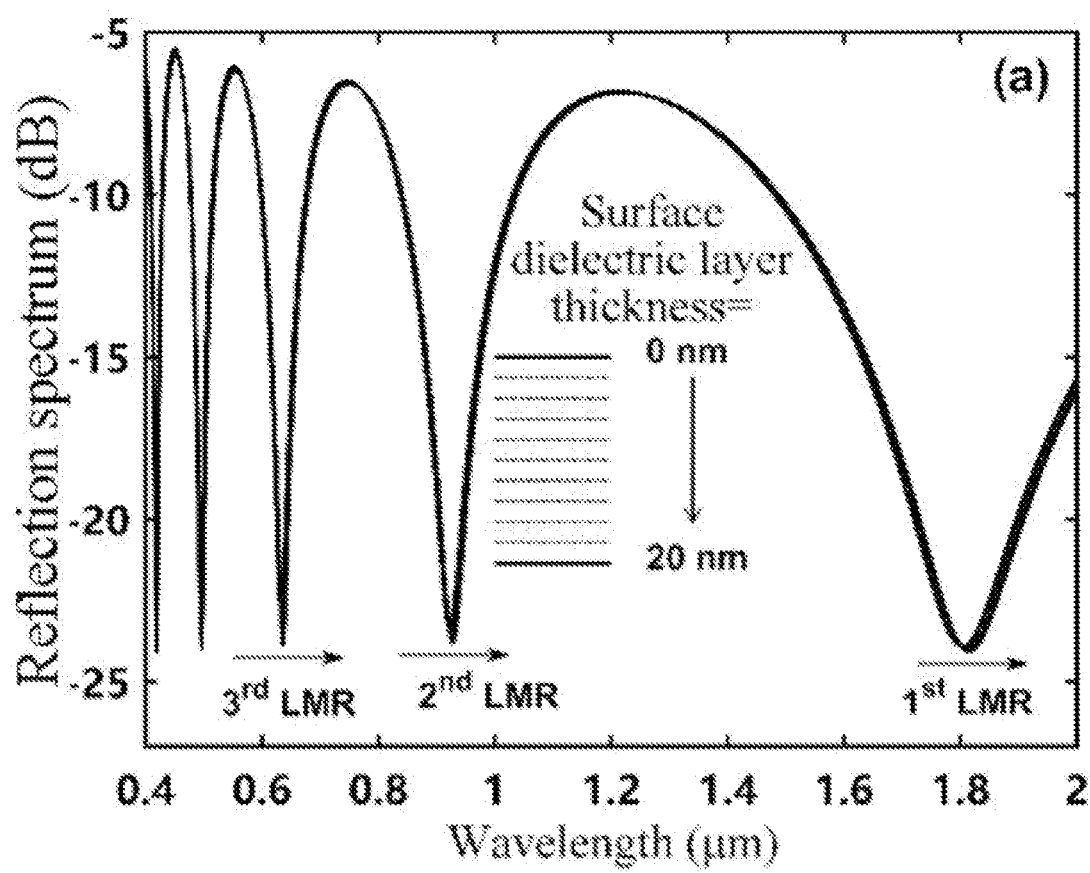
FIGS. 6A-D are diagrams showing a surface sensing characteristic of a fiber-tip probe sensor (in the case of generating fiber-tip leaky mode resonances with a titanium dioxide thin film) in the second embodiment of the present invention.
Figure 6B:
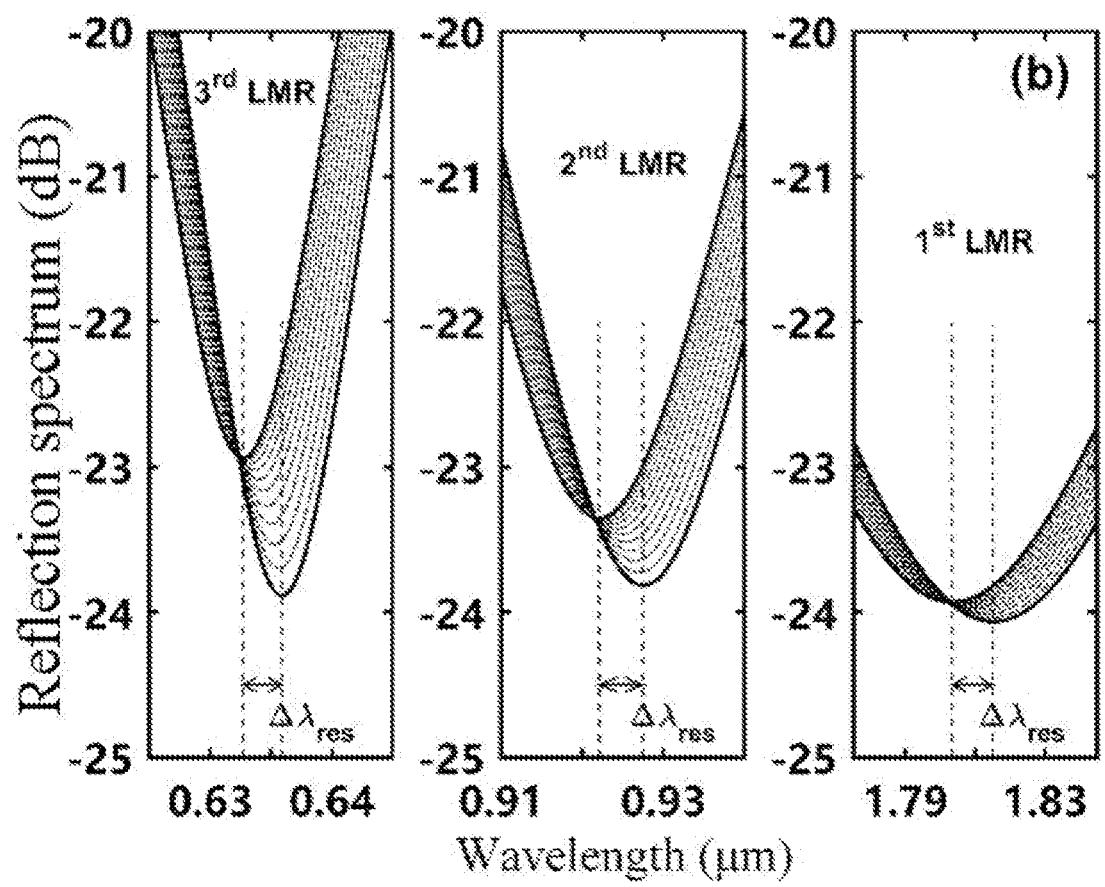
Figure 6C:
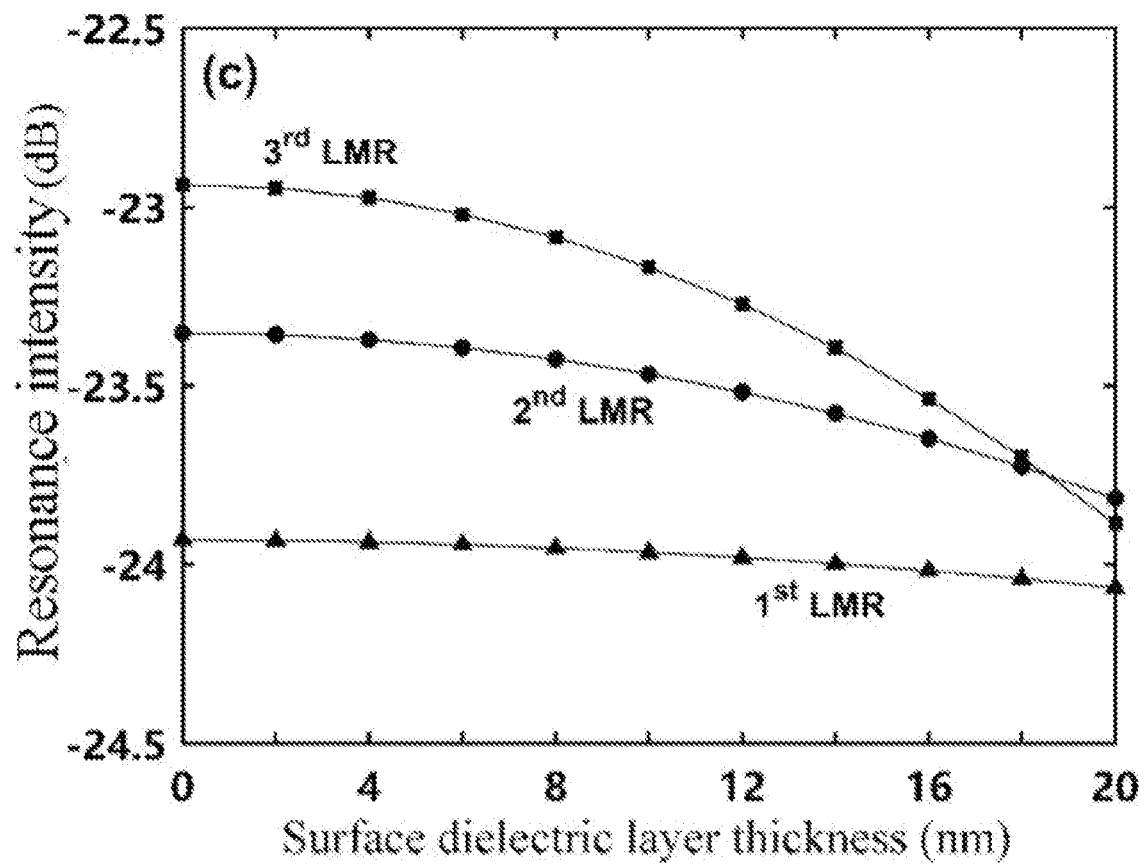
Figure 6D:
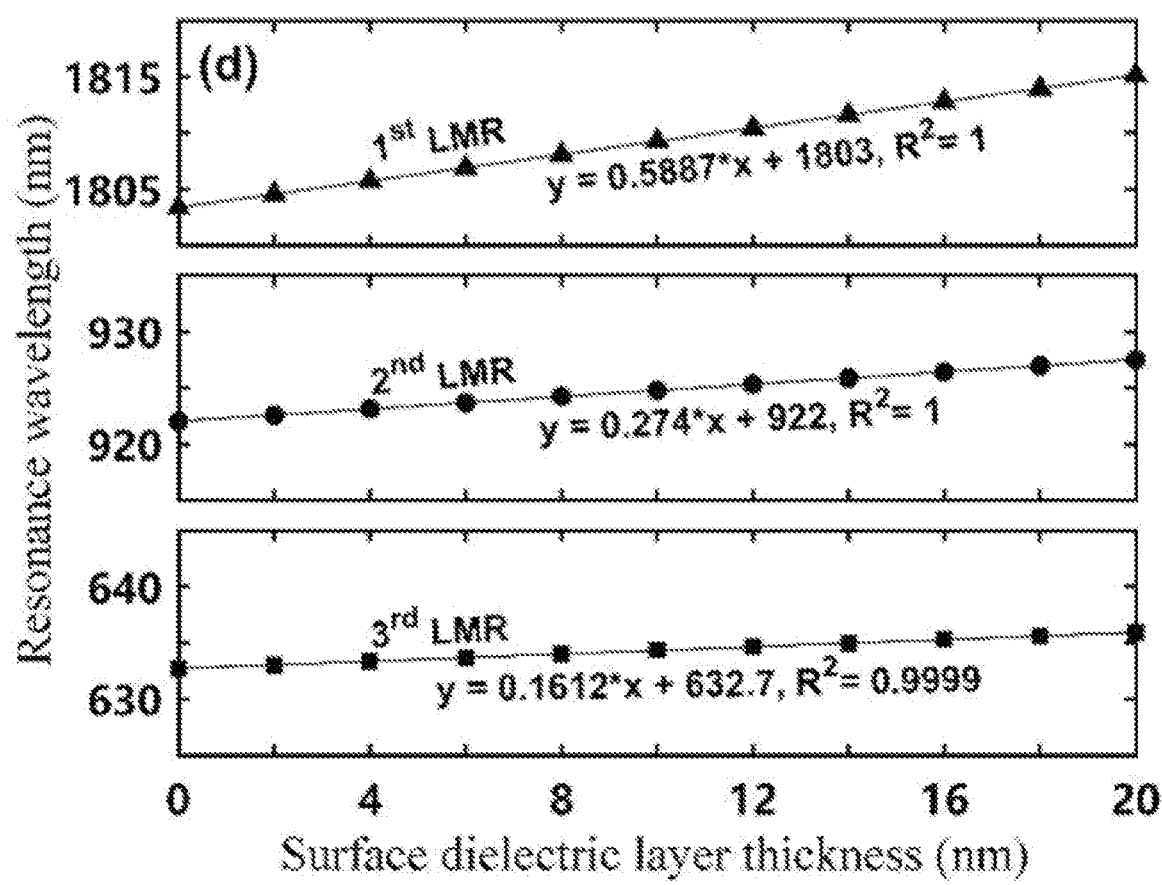

FIG. 4 shows the reflectivity of the interface (on the core side) between optical fiber and the titanium dioxide thin film, and the transmissivity of the interface (on the bulk environment side) between the surface environment and bulk environment without considering the polarization control apparatus. As shown in FIG. 4A, the total internal reflection takes place when the incident angle becomes larger than about 61°. Under this condition, each fiber core mode excite guided mode that propagate within the titanium dioxide thin film. This is also the condition for the generation of conventional surface plasmon resonance and loss mode resonance. As the incident angle becomes less than 61°, however, fiber-tip leaky mode is excited. This is clearly indicated by the fact that the reflectivity is decreased and the transmissivity is increased, which obviously demonstrates that the energy of the fiber core mode is leaked into the bulk environment to thereby generate the fiber-tip leaky mode.

For the actual FT200EMT multi-mode optical fiber, the total internal reflection at the core-cladding interface leads to the actual incident angle $\theta$ larger than 0° but smaller than $\theta_{max}$ that is the maximum incident angle being much smaller than 61°. Thus, it is clearly confirmed that all the modes excited by the fiber core modes in the fiber-tip probe sensor are surely the fiber-tip leaky modes. FIG. 4B illustrates a reflection spectrum of the fiber-tip probe sensor, in which there are five strong fiber-tip leaky mode resonances (LMRs) located from the visible to near-infrared wavelengths. The first three fiber-tip leaky mode resonances are labeled from longer to shorter wavelength as $1^{st}$ LMR, $2^{nd}$ LMR and $3^{rd}$ LMR, respectively. By varying the thickness of the titanium dioxide thin film, the number and position of the fiber-tip leaky mode resonances can be further flexibly tuned.

FIG. 5 illustrates the bulk sensing performance of the fiber-tip probe sensor (in the case of generating fiber-tip leaky mode resonances with a titanium dioxide thin film). As shown in FIG. 5A, the increasing in the bulk refractive index as the characteristic parameter of the bulk environment (from 1.315 to 1.355), causes progressive increasing in the resonance intensity of all fiber-tip leaky mode resonances. This clearly indicates that more energy of the fiber core modes is coupled into the bulk environment. FIG. 5B further details the changing of the resonance intensity of the first three fiber-tip leaky mode resonances with the bulk refractive index. It is clearly shown that during the increasing in the resonance intensity, the resonance waveforms remain unchanged. Meanwhile, the resonance wavelength marked as $\lambda_{res}$ remains constant all the time, as shown in FIG. 5C. Therefore, it is clearly illustrated that the changing of the bulk environment only causes the variation of resonance intensity of the fiber-tip leaky mode resonances while keeping a constant resonance wavelength. In this regard, the dynamic changing process of the bulk environment can be determined by monitoring the changing of resonance intensity of the fiber-tip leaky mode resonances, as verified in FIG. 5D. The resonance intensity of the fiber-tip leaky mode resonances changes linearly with the bulk refractive index and hence, the bulk sensing sensitivity can be obtained as the slope of linear fitting of the raw data. As demonstrated in FIG. 5D, the bulk sensing sensitivity of the first three fiber-tip leaky mode resonances, evaluated by the absolute value of the slope, reaches 57.63 dB/RIU (MU representing a refractive index unit), 57.63 dB/RIU and 57.63 dB/RIU, respectively.

FIG. 6 illustrates the surface sensing performance of the fiber-tip probe sensor (in the case of generating fiber-tip leaky mode resonances with a titanium dioxide thin film). As shown in FIG. 6A, an increase in the thickness of the dielectric layer as the characteristic parameter of the surface environment (from 0 nm to 20 nm), results in a red shifting in the resonance wavelength denoted as $\lambda_{res}$ of all fiber-tip leaky mode resonances, i.e., a shifting towards longer wavelength. FIG. 6B further shows the change in the resonance wavelength of the first three fiber-tip leaky mode resonances with the thickness of the dielectric layer. It is demonstrated that during the red shifting in the resonance wavelength (the variation of resonance wavelength is denoted as $\Delta\lambda_{res}$), the resonance waveforms remain unchanged. As shown in FIG. 6C, the increasing in the thickness of surface dielectric layer causes a small changing of resonance intensity of all fiber-tip leaky mode resonances, but the first fiber-tip leaky mode resonance presents the smallest change (being about 0.12 dB that is at the level of background noise). This clearly demonstrates that the changing of the surface environment mainly causes the changing of resonance wavelength and has a limited effect on the resonance intensity. Therefore, it is clearly illustrated the dynamic changing process of the surface parameter can be determined by monitoring the shifting in the resonance wavelength of the fiber-tip leaky mode resonances, as confirmed in FIG. 6D. It is also show that that the resonance wavelength of the fiber-tip leaky mode resonances shifts linearly with the thickness of the dielectric layer, and the surface sensing sensitivity can be obtained as the slope of linear fitting of the raw data. As demonstrated in FIG. 6D, the surface sensing sensitivity of the first three fiber-tip leaky mode resonances reaches 0.589 nm/nm, 0.274 nm/nm and 0.161 nm/nm, respectively.

The sensing characteristics about the bulk environment and the surface environment obtained in FIG. 5 and FIG. 6 demonstrate that the changing the thickness of dielectric layer at the first resonance peak causes a large shifting in the resonance wavelength but smaller changes in the resonance intensity of the first fiber-tip leaky mode resonance, i.e., the minimum cross sensitivity between bulk environment and surface environment, can be achieved with the first fiber-tip leaky mode resonance. In other words, the resonance changing of the first fiber-tip leaky mode resonance has the maximum bulk and surface sensing sensitivities at the same time, together with the minimum cross sensitivity between them. Thus, with a single fiber-tip leaky mode resonance highly sensitive discrimination between and the bulk and surface parameter can be realized.

In another example, the fiber-tip probe sensor comprises a multi-mode optical fiber and a low-refractive-index magnesium fluoride thin film coated on the end facet of the optical fiber. The optical fiber is the same one used in the previous example above, and the thickness of the magnesium fluoride thin film is 260 nm. Other components of the optical fiber multi-parameter sensing system are the same as those in the previous example.

Figures 7A, 7B:
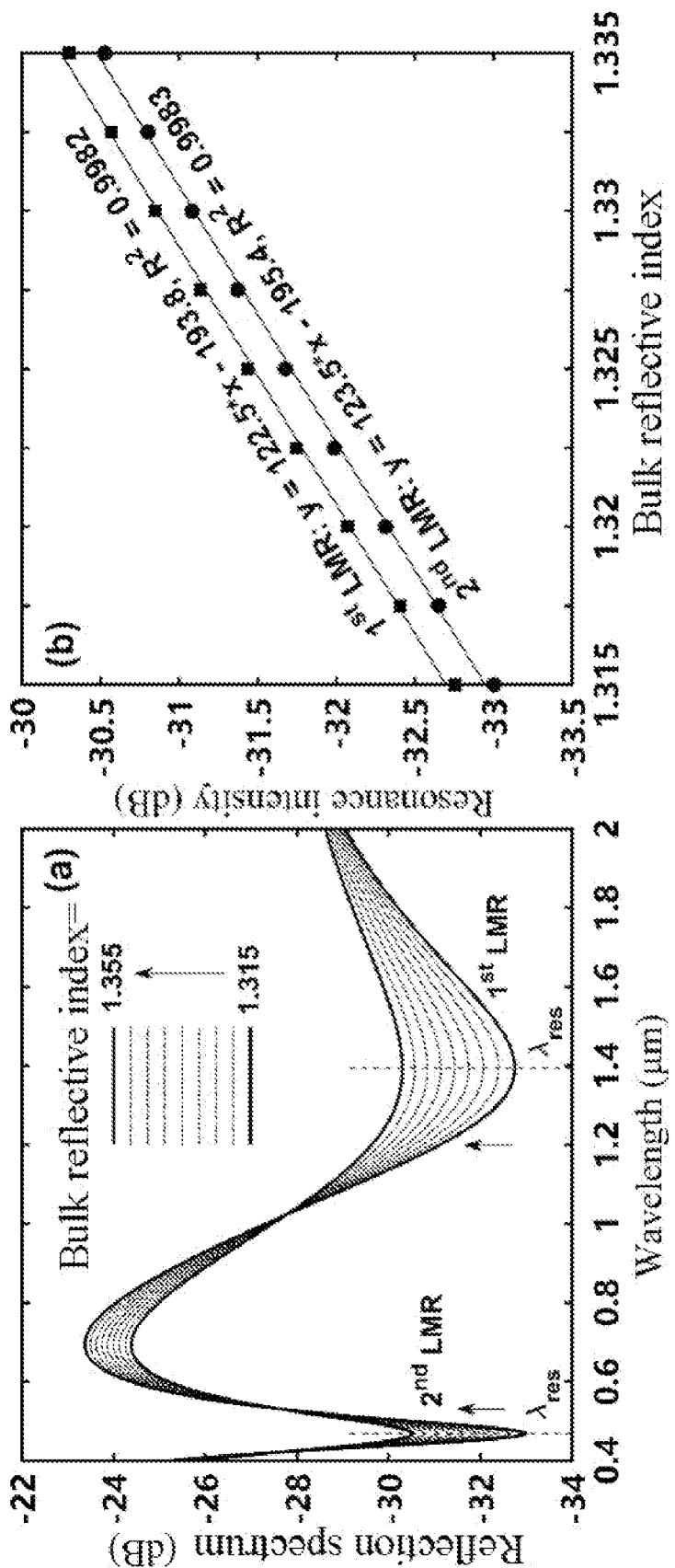
FIGS. 7A-B are diagrams showing a bulk sensing characteristic of a fiber-tip probe sensor (in the case of generating fiber-tip leaky mode resonances with a magnesium fluoride thin film) in the second embodiment of the present invention.

FIG. 7 illustrates the bulk sensing characteristics of the fiber-tip probe sensor (in the case of generating fiber-tip leaky mode resonances with a magnesium fluoride thin film). FIG. 7A illustrates the changing of the reflection spectrum of the fiber-tip probe sensor with the characteristic parameter of bulk environment, namely the bulk refractive index. There are two fiber-tip leaky mode resonances generated in the reflection spectrum, which are labeled as $1^{st}$ LMR and $2^{nd}$ LMR, respectively. Increases in the bulk refractive index causes a decrease in the resonance intensity, but the resonance wavelength denoted as $\lambda_{res}$ always stays constant. Therefore, the dynamic change process of the bulk environment can be determined by monitoring the changes in resonance intensity of the fiber-tip leaky mode resonances, as shown in FIG. 7B. The results clearly demonstrate that the resonance intensity of the fiber-tip leaky mode resonances varies linearly with the bulk refractive index, and the surface sensing sensitivity can be obtained as the slope of linear fitting of the raw data. As demonstrated in FIG. 7D, the bulk sensing sensitivity of these two fiber-tip leaky mode resonances reaches 122.5 dB/RIU and 123.5 dB/RIU, respectively, which are nearly equal to each other but are about twice that obtained in the previous example. This clearly indicates that the bulk sensing performance of the fiber-tip probe sensor can be optimized by replacing the material of the micro-nano thin film and adjusting its thickness.

Figures 8A, 8B:
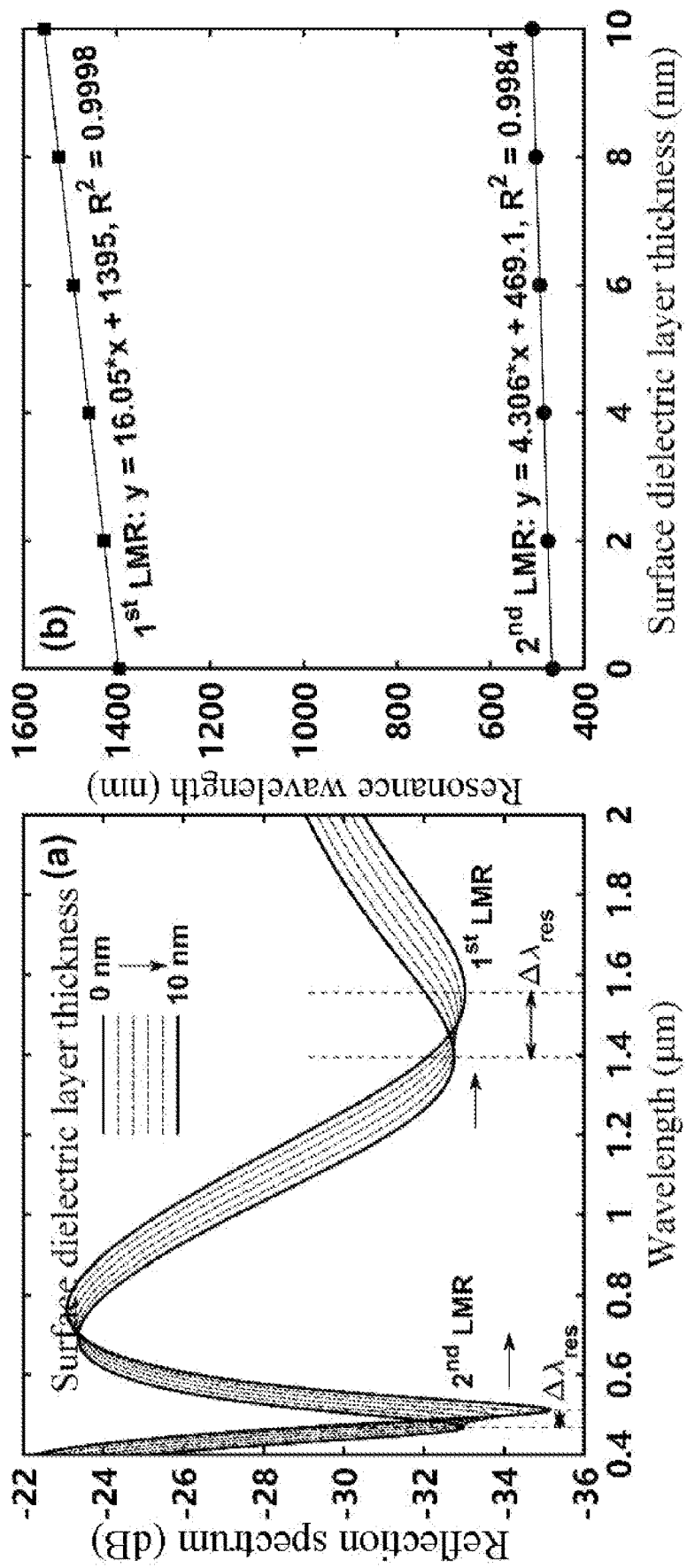
FIGS. 8A-B are diagrams showing a surface sensing characteristic of a fiber-tip probe sensor (in the case of generating fiber-tip leaky mode resonances with a magnesium fluoride thin film) in the second embodiment of the present invention.

FIG. 8 illustrates the surface sensing characteristics of the fiber-tip probe sensor (in the case of generating fiber-tip leaky mode resonances with a magnesium fluoride thin film). As shown in FIG. 8A, increasing (from 0 nm to 10 nm) in the characteristic parameter of the surface environment, namely the thickness of dielectric layer, results in a red shifting in the resonance wavelength denoted as $\lambda_{res}$ of all fiber-tip leaky mode resonances, i.e., a shifting towards longer wavelength. During the red shifting in the resonance wavelength (the variation of resonance wavelength being marked as $\Delta\lambda_{res}$), the resonance intensity of the second fiber-tip leaky mode resonance is increased but the first one presents a small change (being about 0.4 dB that is at the level of background noise). This demonstrates that changing the surface environment causes a shift in the resonance wavelength and a small cross sensitivity between the bulk environment and surface environment. Therefore, the dynamic changing process of the surface parameter can be determined by monitoring the shifting in the resonance wavelength of the fiber-tip leaky mode resonances, as confirmed in FIG. 8D. Thus, the resonance wavelength of the fiber-tip leaky mode resonances shifts linearly with the thickness of the dielectric layer, and the surface sensing sensitivity can be obtained as the slope of a linear fitting of the raw data. As demonstrated in FIG. 8B, the surface sensing sensitivity of these two fiber-tip leaky mode resonances reaches 16.05 nm/nm and 4.306 nm/nm, respectively, which are about 27 and 16 times that obtained in the previous example. Thus, the surface environment sensing performance of the fiber-tip probe sensor can be optimized by replacing the material of the micro-nano thin film and adjusting its thickness.

Specific examples are presented in this disclosure. The specific examples are merely illustrative of the principles and embodiments of the present disclosure, and the above description is merely intended to aid in understanding the method of the present disclosure and core ideas. It should be understood by those skilled in the art that the modules or steps of the present disclosure described above may be implemented with general purpose computer devices. Alternatively, the modules or steps may be implemented with executable program codes of a computing device, so that the modules may be stored in a storage device for execution by the computing device, or manufactured into individual integrated circuit modules, or manufactured into multiple modules or steps of a single integrated circuit module. The present disclosure is not limited to any specific combination of hardware and software.

Meanwhile, to those skilled in the art, changes will occur in terms of implementation and scope of application in accordance with the idea of the present disclosure. In conclusion, the content of this specification shall not be construed as a limitation to the present disclosure.

What is claimed is:

1. An optical fiber multi-parameter sensing method for discriminating between a surface parameter and a bulk parameter of an analyte around a fiber-tip probe sensor, comprising:

obtaining resonance wavelength and resonance intensity of a reflected light wave of the fiber-tip probe sensor with an optical spectrum analyzer, wherein the fiber-tip probe sensor is implanted into the analyte;

determining a surface parameter that is a thickness of a dielectric layer formed from the analyte on an end facet of the fiber-tip probe sensor according to a shifting in the resonance wavelength of the reflected light wave; and determining a bulk parameter that is a bulk refractive index of an analyte around the fiber-tip probe sensor according to a change in the resonance intensity of the reflected light wave.

2. An optical fiber multi-parameter sensing system, comprising:

a light source, an optical circulator, a fiber-tip probe sensor and an optical spectrum analyzer, wherein the light source is connected to a first port of the optical circulator, to transmit a light wave outputted from the light source into the optical circulator;

an input end of the fiber-tip probe sensor is connected to a second port of the optical circulator, and a terminal end that may be placed into an analyte to measure analyte molecules; said light wave outputted from the second port of the optical circulator corresponds to incident light waves of the fiber-tip probe sensor; the incident light wave propagates from the input end to the terminal end of the fiber-tip probe sensor losses energy at the terminal end of the fiber-tip probe sensor, which excites fiber-tip leaky modes; and the remaining incident light wave is reflected light wave, which is reflected back into the optical circulator after propagating from the terminal end to the input end of the fiber-tip probe sensor;

the optical spectrum analyzer is connected to a third port of the optical circulator and is configured to (a) receive a signal of the reflected light wave for detecting a resonance wavelength and a resonance intensity of the reflected light wave; (b) determine, based on a shifting of the resonance wavelength of the reflected light wave, a surface parameter of the analyte to measure said surface parameter being the thickness of a dielectric layer formed from the analyte molecules on an end facet of the fiber-tip probe sensor; (c) determine, according to a changing of the resonance intensity of the reflected light wave, a bulk parameter, said bulk parameter being a bulk refractive index of the analyte around the fiber-tip probe sensor.

3. The optical fiber multi-parameter sensing system of claim 2, wherein the optical fiber multi-parameter sensing system further comprises a polarization control apparatus;

Said polarization control apparatus being arranged between the light source and the first port of the optical circulator; the light source is connected to an input port of the polarization control apparatus, and an output port of the polarization control apparatus is connected to the first port of the optical circulator; the polarization control apparatus is configured to convert the light wave outputted from the light source into linearly polarized light wave that is coupled to the optical circulator.

4. The optical fiber multi-parameter sensing system of claim 3, wherein the polarization control apparatus comprises a polarizer and a polarization analyzer;

the polarizer is configured to convert the light wave outputted from the light source into linearly polarized light wave; and the polarization analyzer is configured to adjust the polarization direction of the linearly polarized light.

5. The optical fiber multi-parameter sensing system of claim 2, wherein the fiber-tip probe sensor comprises an optical fiber and a micro-nano thin film coated on the end facet of the optical fiber;

the optical fiber comprises a core and a cladding surrounding a surface of the core; and the micro-nano thin film is configured to interact with the analyte and absorb analyte molecules on the end facet of the fiber-tip probe sensor to generate the dielectric layer, the interaction resulting in a variation of the thickness of the dielectric layer of the fiber-tip probe sensor.

6. The optical fiber multi-parameter sensing system of claim 5, wherein a material of the micro-nano thin film is selected from a group consisting of dielectric material, metal material, metal oxide material, semiconductor material, two-dimensional material, polymer material, and combinations thereof.

7. The optical fiber multi-parameter sensing system of claim 5, wherein the optical fiber is one of a single-mode optical fiber, a few-mode optical fiber, a multi-mode optical fiber, a micro-nano optical fiber, and a coreless optical fiber.

8. The optical fiber multi-parameter sensing system of claim 5, wherein the fiber-tip probe sensor further comprises one or more protective coating layers on an outer surface of the cladding of the optical fiber.

* * * * *